April 4, 1961 — C. W. STARR — 2,977,711
POISON BAIT STATIONS
Filed Jan. 20, 1958
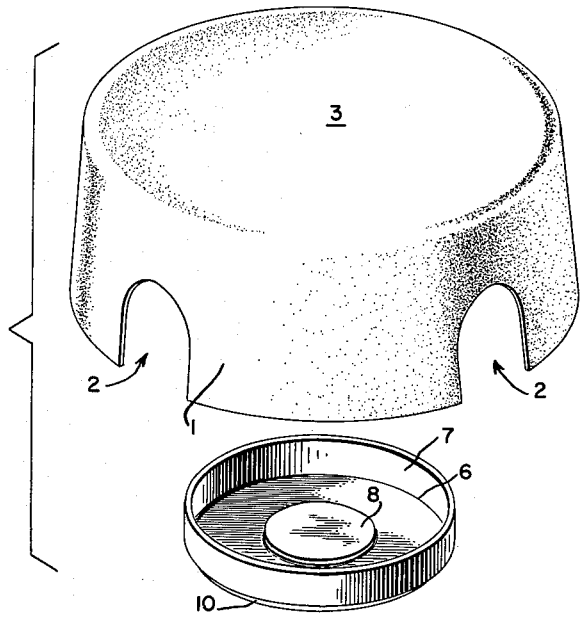
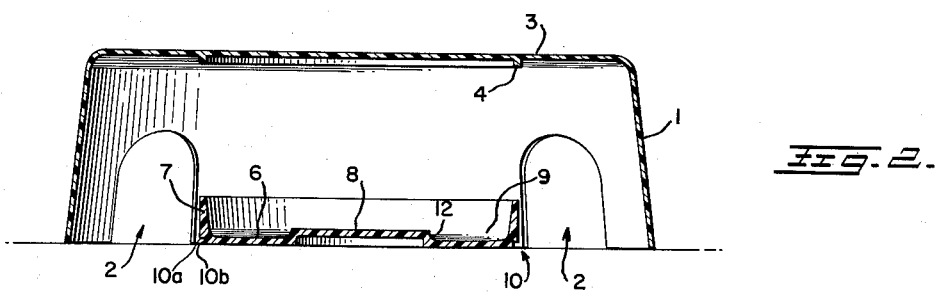
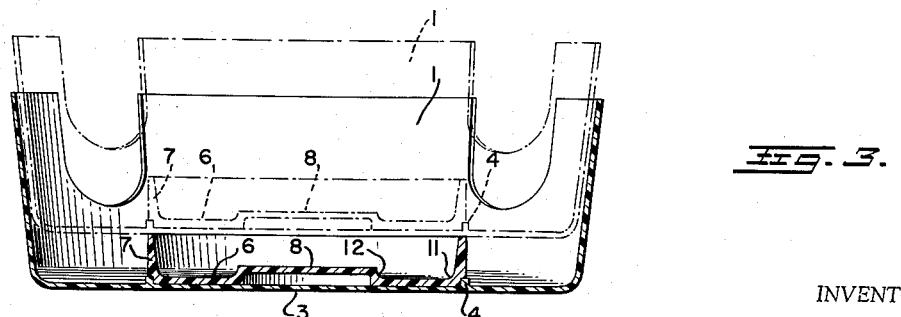
INVENTOR
CHARLES W. STARR
BY *Ralph T. Barrett*
ATTORNEY United States Patent Office 2,977,711
Patented Apr. 4, 1961

2,977,711
POISON BAIT STATIONS
Charles W. Starr, 1216 4th St. S., Nampa, Idaho
Filed Jan. 20, 1958, Ser. No. 709,853
3 Claims. (Cl. 43—131)

This invention relates to improvements in an apparatus for handling poison material or food to provide bait stations such as are used for the extermination of rodents.

The present invention is an improvement over my prior Patent No. 2,710,485, dated June 14, 1955.

The main object of the present invention is to provide an assembly for properly holding and protecting poison bait, the parts of which are relatively simple to manufacture by molding and similar processes, and embodies structural features facilitating the stacking of the components to facilitate storage, handling and shipping.

More specifically the invention comprehends a bait station assembly comprising a first part forming a housing or shield and a second part forming a bait holder, the parts forming the housing being designed for nesting to facilitate storage and shipping and the part comprising the bait holder being adapted for association with the housings during the nesting operation to separate the housing components to prevent their interlocking and to facilitate their separation and handling.

Another object of the invention is to provide the housing of the bait station with a centering flange for positioning the bait holding structure, whereby the latter will be maintained in a center position with respect to the housing and will function as a spacer between a pair of housings when the same are arranged in stacked relation.

Another object of the invention is to provide a housing of relatively light pliant material of a character which can be readily molded or otherwise shaped, the walls of the housing being tapered to facilitate nesting operation, while the top or cap of the housing embodies alignment means for the bait holder during stacking for the purpose of maintaining proper association of the parts when in stacked form during shipping and storage.

These and other objects of the invention will more clearly hereinafter appear by reference to the accompanying drawings forming a part of the instant specification and wherein like characters of reference designate corresponding parts throughout the several views, in which:

Fig. 1 is an exploded view showing the parts of the assembly;

Fig. 2 is a vertical section of the assembly; and

Fig. 3 shows the parts in telescopic stacked association.

The present invention comprehends a poison bait station embodying two separate components, the first component comprehending a shield or housing for enclosing the bait holder and including ports or openings for the passage of rodents for access to the poison in the bait holder. The housing is in the general shape of a truncated cone, including the annular tapered side wall 1 formed with spaced arcuate openings or cut-outs 2 along the free marginal or bottom edge as shown in Fig. 1. The annular side wall 1, as well as the top or cap portion 3, is preferably formed as an integral plastic structure produced by an appropriate molding operation. The taper of the side wall 1 is sufficient to permit the telescopic association of another housing of similar construction and this operation normally would tend to apply substantial lateral stress to the wall and cause breakage, the wall being generally thin and capable of rupture resulting from its construction from a relatively light material such as plastic.

To prevent the complete telescopic association between a pair of housings and the application of rupturing stresses on the wall 1, means are provided whereby the total telescoping association of any pair of housings is prevented. This means includes the use of the poison bait holder between the telescoped housings. To center the poison bait holder when the latter is used as a spacer, the inner face of the top or cap 3 of the housing is provided with an annular rib 4 which projects uniformly and concentrically from the inner face of the wall 3 and is adapted to associate with an annular recess formed in the wall of the bait holder as hereinafter described.

The bait holder is shown in Fig. 1 and comprises a relatively flat receptacle, preferably formed of plastic and including a flat annular base 6 and an annular outer wall or flange 7. The center of the bottom 6 is medially upwardly depressed to form the concentric upstanding annular portion 8 which defines an annular trough indicated at 9, wherein the poison bait may be deposited. At the junction of the bottom 6 and the annular marginal flange 7, there is formed an annular recess 10 defined by the walls 10a and 10b, the dimensions of the recess 10 being appropriate for snugly receiving the annular rib 4 projecting concentrically from the inner face 3 of the housing structure.

It will be noted that to facilitate cleanliness of the structure there are no sharp angular formations, the inner junction of the bottom 6 and of the walls 7 being arcuately formed as at 11, and similarly the medial bottom junction portion of the depression as at 12 is likewise rounded.

It is customary in the use of bait holders of the type in question that they be distributed at numerous points where rodents may use and, therefore, it is not uncommon that a number of these bait stations be required during a single pest extermination operation. Also the present commodity represents a relatively inexpensive item so that it becomes important to provide means for handling, storing and shipping the structures without the use of large amounts of space. To provide for the storage, shipment and general handling of the present bait stations, applicant has designed the housing so that they can be telescoped one into another for storage and shipment, and to prevent the rupturing of the walls of the stations which might result were the parts permitted to be totally telescoped or when telescoped to be placed under pressure, applicant has provided means whereby the bait holder can be inter-nested between the housings and held centrally of the housings when the latter are nested, the bait holders being of such dimension as to prevent a nesting operation which will permit the tapered inner wall of one housing to too greatly expand and thereby rupture the outer nested wall. On the other hand, the bait holder per se is of a dimension and is of relatively heavy construction so that there will be a certain snugness between the housings when they are properly stacked for storage and shipment.

The use of the bait holder in the manner described also provides for the storage and shipment of the bait holders simultaneously with the housings in appropriate numbers, so that they can be dispensed in units of a single housing and a single bait holder as is required for proper use.

What I claim is:
1. In a rodent bait station assembly, a relatively thin plastic housing of truncated form defined by a tapered annular wall having entrance openings formed therein, and a flat top, said top having a concentric annular rib projecting from its inner surface, a bait retainer adapted to be positioned within the housing when the latter is in its normal position to permit access thereto through the entrance openings, said retainer being defined by a bottom and a marginal wall of substantially less height than the annular wall of the housing and being formed with an annular recess in its bottom for receiving the said annular rib when the housing is inverted to form a separator between a pair of housings of similar construction and dimension when telescopically associated to prevent wedging of said annular tapered walls.

2. In a rodent bait station assembly, a relatively thin plastic housing of truncated form defined by a tapered annular wall having entrance openings formed therein, and a top, said top having a concentric rib projecting from its inner surface, a bait retainer adapted to be positioned in the housing, said bait retainer being defined by a bottom and a marginal wall of less height than the tapered annular wall of the housing and being formed with an annular recess at its bottom marginal edge for receiving the said rib and to provide a spacing member between a pair of housings of similar construction when inverted and telescopically associated to prevent rupture of the housing walls.

3. The structure of claim 2 characterized in that the marginal wall of the bait retainer comprises a seat for the top of the housing when the parts are telescopically stacked.

References Cited in the file of this patent

UNITED STATES PATENTS

| | | |
|---|---|---|
| 1,714,666 | Gring | May 28, 1929 |
| 2,329,603 | Gerahty | Sept. 14, 1943 |
| 2,564,834 | Devine et al. | Aug. 21, 1951 |
| 2,664,663 | Mullen | Jan. 5, 1954 |
| 2,710,485 | Starr | June 14, 1955 |
| 2,779,624 | Friedman | Jan. 29, 1957 |

FOREIGN PATENTS

| | | |
|---|---|---|
| 430,946 | Great Britain | Feb. 4, 1935 |